May 13, 1941.　　　O. S. McGUFFEY　　　2,241,411
REFRIGERATION
Filed July 3, 1939
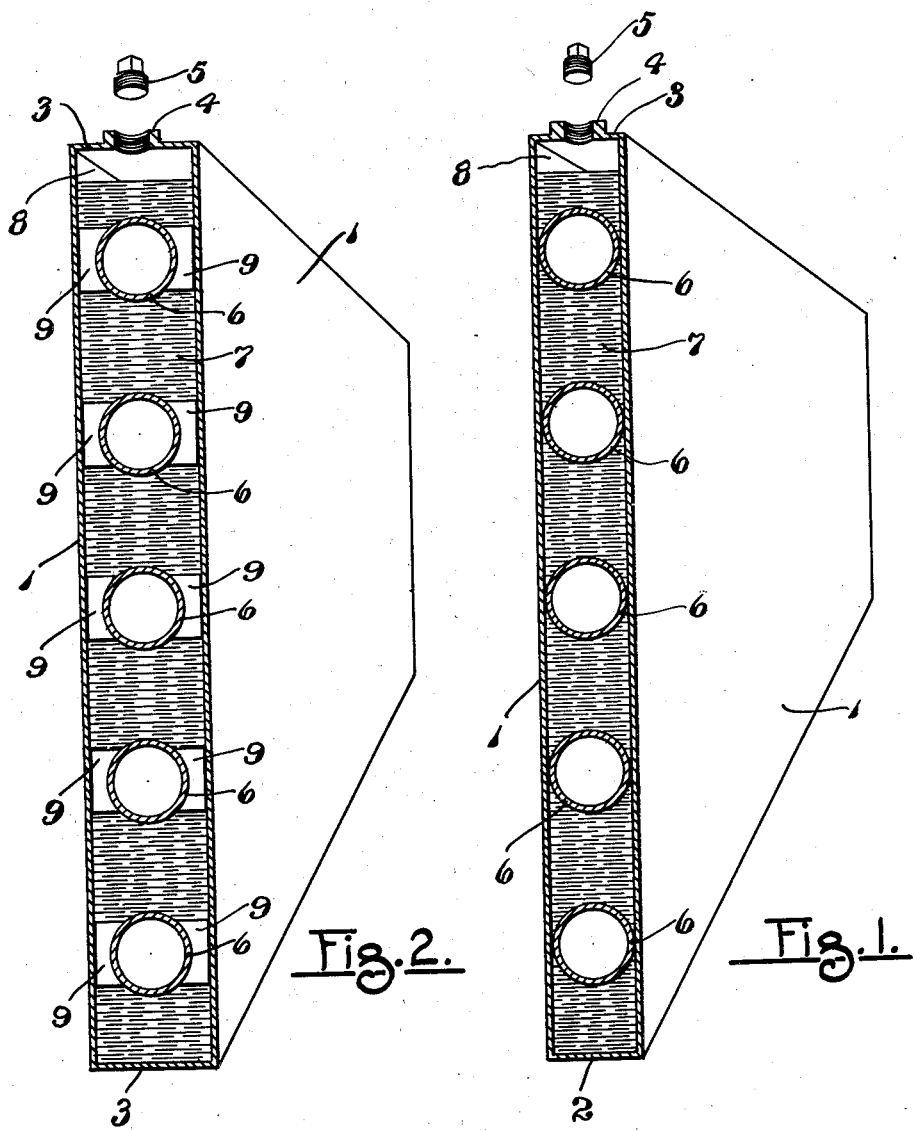

Patented May 13, 1941

2,241,411

UNITED STATES PATENT OFFICE 2,241,411

REFRIGERATION

Orton S. McGuffey, Lansing, Mich., assignor to Kold-Hold Manufacturing Company, Lansing, Mich., a corporation of Michigan Application July 3, 1939, Serial No. 282,600

2 Claims. (Cl. 62—1)

This invention relates particularly to the art of refrigeration, and more generally to heat exchange appliances of the type and character which are shown in United States Letters Patent to Finch, No. 1,969,124, issued August 7th, 1934, or in the patent to Whitesel, No. 2,063,646, granted December 8th, 1936. In the Finch patent, a flat rectangular tank is filled substantially at least seven-eighths full with a freezible solution, consisting of water in which is dissolved a soluble salt or salts, the effect of which is to change the temperature point at which the solution freezes, to one that is lower than the freezing point of water. The tank is sealed against air entrance or escape or against the escape of liquid, and is partially filled in order to provide space for the expansion which takes place when the liquid solution is converted to ice. The freezing of the solution is by the circulation of a refrigerant through a refrigerating coil or evaporator, which extracts heat from the solution and changes it from liquid to a frozen solid ice form.

In the practical use of units of this or a similar kind, it has been found that there is a strong tendency for the metals of the tank and of the evaporator to oxidize or corrode. In making the solution, the salts which are used are customarily mixed with water taken at the tap from the water main. It is necessary to violently agitate or stir the mixed water and salts so that the salts will rapidly dissolve. And from the solution thus made, a predetermined definite amount in weight is placed within the tank, the amount which is to be used having previously been experimentally determined as one which will fill the tank substantially seven-eighths or 90 percent full. In general the maximum amount of the solution used will fill the tank 91 percent full, beyond which with any greater amount of the solution, there is a liability of expansion of the ice such that it will occupy too much space and will either bulge the tank or disrupt it.

Agitation and stirring in dissolving the solute used, results in the solution absorbing a considerable amount of air which, as it contains oxygen, makes the solution when placed within the tank, an oxidizing or corroding agent, with a resultant corrosion of the refrigerant coils and the inner sides of the tank, with a lowering of the rate of heat conduction from the solution to the refrigerant in the coils, or from the outside atmosphere through the sides of the tank to the ice when the tanks, after they have been frozen, are used for refrigerating purposes. This corrosion of the interior surfaces is traceable directly to the free oxygen present. Some of course would be present in the unfilled space within the tank, but the solution made from tap water at room or lower than room temperature itself carries the major active oxidizing agent, to corrode the submerged surfaces of the tank and evaporator. For at ordinary atmospheric pressures there is present in each liter of water at 0° F., 10 cubic centimeters of free oxygen. This will be reduced to 4 cubic centimeters per liter at 100° F. correspondingly at 40° or 50° F. the oxygen present is between 4 and 10 cubic centimeters in a liter of water. With reductions of pressure below atmospheric pressure, the free oxygen present will be reduced but nevertheless still remain in quite considerable amounts. For example, if the pressure is reduced to one-half of ordinary atmospheric pressure, the amount of free oxygen present will be reduced substantially one-half also. With the water taken from the water mains at approximately 40 or 50° F., and particularly with the stirring and agitation which has an effect somewhat similar to aeration, there is considerable free oxygen present in the solution.

The present invention is concerned with a novel, practical and useful method or process for eliminating and driving out the oxygen containing air from the solution and also from the unfilled space in the container. Attempts have been made to do this previously by exhausting air from the container. It is substantially impossible to obtain a complete vacuum. At sea level air pressure is measured in 30 inches of mercury. To attain a vacuum such that the pressure within the container is measured in from 4 to 6 inches in mercury, that is, the pressure has been decreased from normal air pressure measured at 30 inches of mercury by drawing 24 to 26 inches of mercury vacuum, considerable care has to be used, the evacuating machinery must be of a very good and therefore relatively expensive character, extreme care must be used to insure against any intake of air into the tank during and after the vacuum drawing evacuation and after the evacuation has taken place, and at that it is wholly impossible to remove all of the air containing oxygen, for some of it will be left, both dissolved in the solution and in the unfilled space within the tank.

In the drawing which shows views of a freezing unit similar to that shown in the Finch patent, Fig. 1 is a vertical section and partial perspective of a unit including plain evaporator pipes with the sides of the tank engaging thereagainst, as in the Finch patent.

Fig. 2 is a similar view showing the evaporator tanks equipped with outwardly extending fins, against the edges of which the sides of the tank engage, and Fig. 3 is a horizontal section through the tank substantially at a plane of one of the evaporator or coil pipes.

Like reference characters refer to like parts in the different figures of the drawing.

The tank of flat metal has parallel sides 1, a lower rather narrow bottom 2, and a top 3. It also has vertical ends of the same width substantially as the bottom and top. In the top 3 a bushing 4 having a screw-threaded opening for filling the tank is shown, which opening may be sealed by a screw-threaded plug 5. In Fig. 1 the evaporator or refrigerant carrying pipe 6, the coils of which are spaced apart vertically, extend horizontally across between the sides 1 of the tank. Like in the Finch patent referred to, the tank is filled anywhere from seven-eighths to 91 percent full with a freezible solution 7, leaving a space 8 at the upper portion of the tank which is unfilled. In Figs. 2 and 3 the pipes 6 have fins 9 secured thereto which extend outwardly so that their edges come against the inner surfaces of the sides 1 of the tank.

With my invention, two specific practices may be followed. Instead of filling the tanks approximately 90 percent full of a solution which has been made by violently stirring and agitating water at a temperature at which it is taken from the main to dissolve the solute therein, and then attempting to evacuate all air from the space 8, I take this solution which has been made, and heat it, elevating it to a temperature which very closely approaches the boiling point of the solution. Different solutions have different boiling points. For example some freezing solutions would boil at 225° F., others as low as 165° F. but in every case, having determined what the boiling point of the solution is, it is heated to a temperature just below the boiling point, with the result that the air containing oxygen is driven from the solution. It is common knowledge that in heating water, as the temperature is being raised, there is a collection of bubbles at the contacting surfaces of the water and the containing vessel, which bubbles detach from the walls of the vessel and rise to the top and go into the air. The same thing occurs in heating the solution, which may be heated in any suitable manner, so that when a temperature just immediately below the boiling point is reached, the solution is substantially free of air or oxygen.

The solution is then used to fill the tank to approximately 90 percent of its capacity. When the solution is raised to just below its boiling point it gives off water vapor. When the tank is filled ninety percent full, the vapors still continue to rise from the solution and fill the space at 8 and pass outwardly through the filling opening at the bushing 4. The vapors, mixing with the air and passing outwardly through said opening, carry the air from the space at 8 out of the tank, and eventually the space at 8 is completely filled with water vapor with no air, inasmuch as the vapor continually rises from the upper surface of the almost boiling solution. When the air has all been thus driven from the tank, the opening is sealed by the sealing plug 5 and there is no air within the tank, none in the space at 8, and substantially none carried in solution by the solution 7.

Another practice which may be followed and which is directly equivalent in results is to fill the tank with its known weight of the solution, so as to approximately fill 90 percent of the space within the tank, and then heat the tank and the solution within it in an oven or by electric coils or in any other way that heat can be applied thereto, to raise the temperature of the solution within the tank very closely to the boiling point. As the heating progresses, the air which has in it the regular amount of oxygen which is dissolved within the water of the solution, is driven off, first rising through the solution to the space at 8, and then as the temperature approaches the boiling point, vapors arise from the upper surface of the solution. When the process is substantially complete there will be vapors passing continuously out of the opening at 4. The tank is thereupon sealed by the sealing plug at 5. Care is to be taken that after the tank is sealed it is not left for further heating, which would produce undesirable pressure within the tank. In practice the unsealed tank is taken away from the source of heat and then sealed, whereupon it begins to cool, with a cooling and condensing of the vapors in the space at 8 and with a normal contraction, in accordance with its coefficient of expansion, of the liquid solution. While it forms no part of the present invention in practice, the tank construction is such that such liquid contraction and vapor condensation, as a result of which there is a lowering of the internal pressure within the tank, does not produce any objectionable deformation of the tank, regardless of the temperature to which it is lowered. The sides of the tank may be braced between themselves with reinforcing construction especially for that purpose or by the proper proportion and placing of the heat conducting extensions of the refrigerant coil, or by the proper dimensioning and location of the refrigerant coil itself in such a way that the sides of the tank will sustain the outside atmospheric pressure without objectionable deformation.

When the second of the above described practices is followed, it may also be coupled with a curing or baking of the outside finish applied to the outer surface of the tank. For example the tank which is to be filled with the solution may have applied thereto a finishing coat after the tank has been approximately 90 percent filled with the solution, and then the tank brought to the source of heat. There are a great many synthetic finishes which must be cured at elevated temperatures, and the heat which elevates the temperature of the solution, at the same time cures the outer finish to the tank. Valuable use may also be made of the heat which is contained in the solution when the first of the above described practices is followed, in applying a finish to the outer sides of the tank, the drying of which will be quickened from the heat of the solution within the tank.

It is further contemplated in my invention that the tank with the solution in it may be vibrated or jarred to dislodge or break loose bubbles of air, gas or the like which might cling to points or edges or other parts of the surfaces at the inner sides of the tank and which otherwise, without the jarring or vibration, might remain and be held in engagement with said inner sides of the tank. Therefore, to insure that the air or gases which are separated from the solution shall rise to the top thereof and to the unfilled space in the tank and thence be carried out by the vapors to the outside through the filling opening, the tank is jarred or vibrated in any suitable manner to effect such dislodgment of the air or gas bubbles. There are many ways in which vibration or jar may be given to the tank, such as striking them or handling the tanks with the heated solution therein, which will effectively dislodge the air and gas bubbles and insure that they will be separated from the solution.

With this process all of the troubles and difficulties and the tedium of operation in attempting to exhaust air by air evacuating machinery from the tank, are avoided. There is no need of very perfect check valves to insure against return of air into the tank while it is being evacuated. Complete elimination of free oxygen is attained, which is impossible with air evacuation. With the method which I have invented, the corrosion or oxidation taking place within the container in service is very markedly reduced. The containing tank itself may be simplified in design, and there is no necessity to provide evacuation valves or other accessories, nor is it necessary to use the tedious process of evacuating the air and immediately sealing each unit individually. A still further result and benefit of this method is the attainment of more uniform and consistent performance and practice in the course of ordinary manufacturing procedure, for the present invention gives easily controllable conditions as distinguished from the difficult conditions which are faced in air evacuation of the units. This results in a better standard of excellence and one of a far more uniform character than may be attained with previous methods.

Having thus fully described my invention, what I desire to claim and secure by Letters Patent is:

1. The herein described method of producing a refrigerating unit which consists, in providing a closed refrigerating tank hermetically sealed at all places except at an opening therein for filling the tank, supplying a freezable solution which has been heated nearly to its boiling point to said tank while the solution is still sufficiently hot to have vapors rising therefrom, and filling it through said filling opening to substantially ninety percent of its capacity, and sealing said filling opening after an interval of time sufficient for the vapors rising from the heated solution to exclude air from the unfilled space within the tank and before the solution has materially lowered in temperature.

2. The method defined in claim 1, coupled with applying a liquid finishing coat to the outside of the tank closely contemporaneous to the time of filling said tank with the heated solution, whereby the heat of said solution will aid in drying or curing the finish applied.

ORTON S. McGUFFEY.